(12) United States Patent
Du et al.

(10) Patent No.: US 8,461,753 B2
(45) Date of Patent: Jun. 11, 2013

(54) FLUORESCENT LAMP WITH MULTI-LAYER PHOSPHOR COATING

(75) Inventors: Fangming Du, Northfield, OH (US); William Winder Beers, Chesterland, OH (US); Jon Bennett Jansma, Pepper Pike, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/280,570

(22) Filed: Oct. 25, 2011

(65) Prior Publication Data

US 2013/0099656 A1    Apr. 25, 2013

(51) Int. Cl.
*H01J 1/62* (2006.01)
(52) U.S. Cl.
USPC .............................. 313/487; 313/489; 313/635
(58) Field of Classification Search
None
See application file for complete search history.

(56) References Cited

U.S. PATENT DOCUMENTS

| | | | |
|---|---|---|---|
| 4,088,923 A | 5/1978 | Manders | |
| 4,305,019 A | 12/1981 | Graff | |
| 4,623,816 A | 11/1986 | Hoffman et al. | |
| 4,751,426 A | 6/1988 | Hoffman et al. | |
| 4,806,824 A | 2/1989 | Paynter et al. | |
| 5,045,752 A | 9/1991 | Jansma | |
| 5,309,069 A * | 5/1994 | Sigai et al. | 313/486 |
| 5,714,836 A | 2/1998 | Hunt et al. | |
| 5,838,101 A | 11/1998 | Pappalardo | |
| 5,854,533 A | 12/1998 | Pappalardo | |
| 6,137,217 A | 10/2000 | Pappalardo et al. | |
| 6,583,566 B1 * | 6/2003 | Jin et al. | 313/637 |
| 7,402,955 B2 | 7/2008 | Chau et al. | |
| 2003/0155857 A1 | 8/2003 | Soules et al. | |
| 2005/0179358 A1 * | 8/2005 | Soules et al. | 313/487 |

FOREIGN PATENT DOCUMENTS

EP   594424   10/1993

* cited by examiner

*Primary Examiner* — Ashok Patel
(74) *Attorney, Agent, or Firm* — GE Global Patent Operation; Peter T. DiMauro

(57) ABSTRACT

A low-pressure discharge lamp includes, in an exemplary embodiment, a light-transmissive envelope, a fill-gas composition capable of sustaining a discharge sealed inside the light-transmissive envelope, and a phosphor composition at least partially disposed on an interior surface of the light-transmissive envelope. The phosphor composition is disposed on an interior surface of the light-transmissive envelope in a plurality of layers that include at least a basecoat phosphor layer and a topcoat phosphor layer. The basecoat phosphor layer includes at least one halophosphor and the topcoat phosphor layer includes a blend of at least two rare earth phosphors. The basecoat phosphor layer has a greater Color Rendering Index (CRI) value than the topcoat phosphor layer.

20 Claims, 1 Drawing Sheet

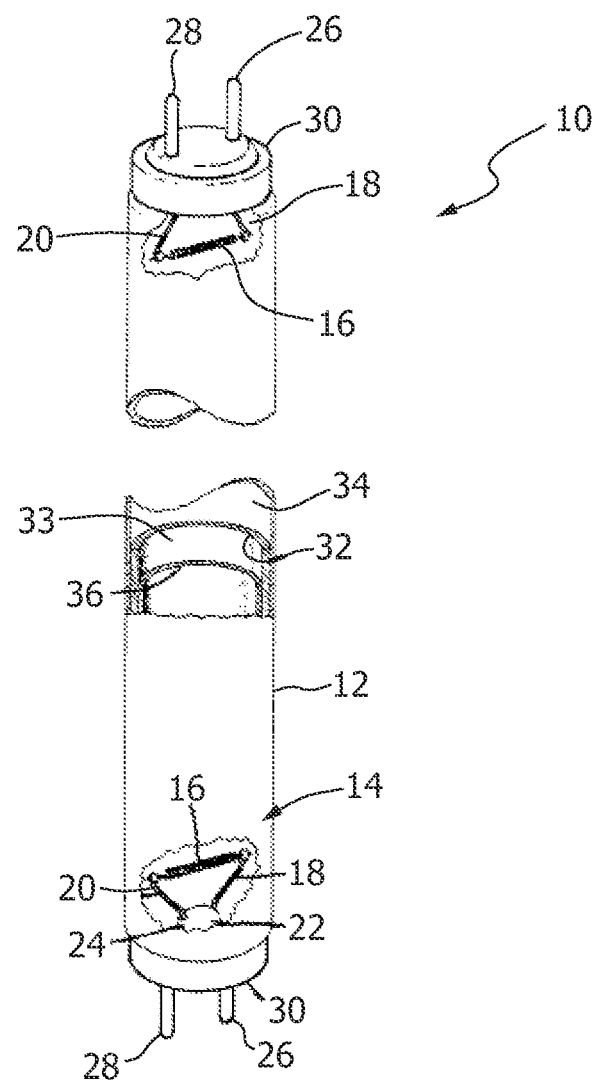

FLUORESCENT LAMP WITH MULTI-LAYER PHOSPHOR COATING

BACKGROUND OF THE INVENTION

The field of the invention relates generally to fluorescent lamps and more particularly, to fluorescent lamps having a multi-layer phosphor coating that provides a high color rendering index with acceptable brightness at economical cost.

Fluorescent lamps may employ various combinations of three or four narrow band emitting phosphor materials for conversion of UV light to visible light, each phosphor material producing a red, a blue or a green color emission. The combination of phosphor materials is useful in low pressure type mercury vapor discharge lamps. Typically, a blue color emission phosphor exhibits an emission band in the wavelength range from about 430 nanometers wavelength up to about 500 nanometers wavelength, a red color emission phosphor exhibits an emission band in a wavelength range from about 590 nanometers wavelength up to about 670 nanometers wavelength, and a green color emission phosphor producing emission extending from about 500 nanometers wavelength up to about 600 nanometers wavelength. This phosphor combination produces efficient white illumination. A blend of four narrow band emitting phosphor materials may include first and second green emitting phosphors, having different visible emission spectrum, a third blue emitting phosphor, and a fourth red emitting phosphor. Some known phosphor combinations have employed a dual layer phosphor coating. Specifically, a thin layer of the tri-phosphor combination may be deposited on the surface of a basecoat of conventional calcium haloapatite phosphor material to produce the desired high light output with fair color rendition at a considerable cost savings for the overall phosphor combination. But in these known dual phosphor coatings, the color rendering index (CRI) of the basecoat is typically about 70, and the triphosphor top layer typically has a CRI of about 83; that is, the CRI of the basecoat is always much lower than that of the topcoat. The combination of the layers results in a CRI of about 78. There continues to be a need for further energy efficient lamps that reduces the cost of relatively expensive phosphor materials.

BRIEF DESCRIPTION OF THE INVENTION

In one aspect, a low-pressure discharge lamp is provided. The low-pressure discharge lamp includes a light-transmissive envelope, a fill-gas composition capable of sustaining a discharge sealed inside the light-transmissive envelope, and a phosphor composition at least partially disposed on an interior surface of the light-transmissive envelope. The phosphor composition is disposed on an interior surface of the light-transmissive envelope in a plurality of layers that include at least a basecoat phosphor layer and a topcoat phosphor layer. The basecoat phosphor layer includes at least one non-rare earth phosphor and the topcoat phosphor layer includes a blend of at least two rare earth phosphors. The basecoat phosphor layer has a greater Color Rendering Index (CRI) value than the topcoat phosphor layer.

In another aspect, a low-pressure discharge lamp is provided which includes a light-transmissive envelope, a fill-gas composition capable of sustaining a discharge sealed inside the light-transmissive envelope, and a phosphor composition at least partially disposed on an interior surface of the light-transmissive envelope. The phosphor composition is disposed on an interior surface of the light-transmissive envelope in a plurality of layers, the plurality of layers comprising at least a basecoat phosphor layer and a topcoat phosphor layer. The basecoat phosphor layer comprises at least one non-rare earth phosphor, and the topcoat phosphor layer comprises a blend of at least three rare earth phosphors. The basecoat phosphor layer comprises a greater Color Rendering Index (CRI) value than the topcoat phosphor layer, and the lamp exhibits an overall CRI value of at least about 87. The weight of the basecoat phosphor layer is greater than the weight of the topcoat phosphor layer, and the difference in correlated color temperature between the basecoat phosphor layer and a topcoat phosphor layer does not exceed about 1000 K.

In yet another aspect, a method of making a low-pressure discharge lamp is provided. The method includes coating an inner surface of a light-transmissive envelope with a first phosphor coating composition that includes at least one non-rare earth to form a basecoat phosphor layer, and coating a surface of the basecoat phosphor layer with a second phosphor coating composition that includes a blend of at least two rare earth phosphors to form a topcoat phosphor layer. The basecoat phosphor layer has a greater Color Rendering Index (CRI) value than the topcoat phosphor layer.

BRIEF DESCRIPTION OF THE DRAWINGS

FIG. 1 is a perspective view partially broken away of a low pressure mercury discharge fluorescent lamp construction having a multi-layer phosphor coating in accordance with an exemplary embodiment.

DETAILED DESCRIPTION

Fluorescent lamps having a multi-layer phosphor coating that may provide a color rendering index (CRI) of 87 or greater, with acceptable brightness at economical cost, are described below in detail. The multi-layer phosphor coating is formed from a plurality of layers that include at least a basecoat phosphor layer and a topcoat phosphor layer. The basecoat phosphor layer includes at least one non-rare earth phosphor (a non-limiting example being a halophosphor), and the topcoat phosphor layer includes a blend of at least two rare earth phosphors, with the basecoat phosphor layer having a greater Color Rendering Index (CRI) value than the topcoat phosphor layer. The basecoat phosphor layer provides for a high CRI and a desired correlated color temperature (CCT) while the topcoat phosphor enhances the amount of lumens per watt. For example, a lamp having only the basecoat phosphor layer may produce over 90 CRI and 55 lumens per watt. However, by adding a topcoat phosphor layer of a blend of at least two rare earth phosphors may produce 65 lumens per watt and over a 87 CRI for lamps using the combination. A combination of the basecoat phosphor layer and the topcoat phosphor layer reduce the amount of the blend of at least two rare earth phosphors which reduces the cost of these relatively expensive phosphor materials in a fluorescent lamp.

Correlated color temperature is a measure of the warmth or coolness of the color emitted by a lamp, and is measured in units of degrees Kelvin. For example, a lamp having a CCT of 3000 K has approximately the same color as an ideal blackbody glowing at that temperature. Lamps are manufactured to a desired CCT with the use of different phosphors in the basecoat phosphor layer and the topcoat phosphor layer deposited inside the light-transmissive envelope of the lamp. Typically, warm-white fluorescent lamps have a CCT of about 2700 K, neutral-white fluorescent lamps have a CCT of about 3000 K to about 3500 K, cool-white fluorescent lamps have a CCT of about 4100 K, and daylight fluorescent lamps have a CCT of about 5000 K to about 7500 K.

For a lamp to achieve a CCT of any given value, it is advantageous to ensure that the CCT of the individual layers are not too far apart from each other, usually within about 1000 K. Thus, for example, to achieve a target lamp CCT of about 5000 K, a basecoat phosphor layer having a CCT of 4500 K and a topcoat phosphor layer of 5500 K, or vice versa, may be used. Of course, the ideal situation would use identical CCT values for each of the phosphor layers. As would be readily understood by the person skilled in the field, one may readily ascribe values of "CCT" and "CRI" to individual layers since these values can be ascertained by making the same lamp using only one of the layers. In other words, for example, by making a fluorescent lamp using only a phosphor layer comprising at least one halophosphor, a value for the CCT and CRI "of" that layer can be determined by examination of the light emitted by the lamp, through conventional methods. The same can be done for a lamp having only a "topcoat" layer comprising at least two rare earth phosphors.

As generally known, a "phosphor" is a luminescent material that absorbs radiation energy in a portion of the electromagnetic spectrum and emits energy in another portion of the electromagnetic spectrum. One important class of phosphors are crystalline inorganic compounds of high chemical purity and of controlled composition to which small quantities of other elements (called "activators") have been added to convert them into efficient luminescent materials. Phosphors are used in low pressure (e.g., mercury vapor) discharge lamps to convert ultraviolet ("UV") radiation emitted by the excited mercury vapor to visible light.

The description below describes a low pressure mercury discharge fluorescent lamp that includes a sealed light-transmissive envelope having a circular cross section for describing an exemplary embodiment. However, it is contemplated to be within the scope of the disclosure to make and use the lamps disclosed herein, in a wide variety of types, including mercury fluorescent lamps, low dose mercury, very high output fluorescent, and mercury free low-pressure fluorescent lamps. The lamp may include electrodes or may be electrodeless. The lamp may be linear, but any size shape or cross section may be used. It may be any of the different types of fluorescent lamps, such as T5, T8, T12, 17 W, 20 W, 25 W, 32 W, 40 W, 54 W, 56 W, 59 W, 70 W, linear, circular, 2D, twin tube or U-shaped fluorescent lamps. The lamps may be high-efficiency or high-output fluorescent lamps. For example, embodiments may include lamps that are curvilinear in shape, as well as compact fluorescent lamps as are generally familiar to those having ordinary skill in the art. Compact fluorescent lamps (CFL's) have a folded or wrapped topology so that the overall length of the lamp is much shorter than the unfolded length of the glass tube. The varied modes of manufacture of and configurations for linear as well as compact fluorescent lamps are generally known to persons skilled in the field of low pressure discharge lamps.

The lamp described below is a low-pressure discharge lamp (e.g., fluorescent). Such lamp typically includes at least one light-transmissive envelope which can be made of a vitreous (e.g., glass) material and/or ceramic, or any suitable material which allows for the transmission of at least some visible light. A fill-gas composition capable of sustaining an electric discharge is sealed inside the at least one light-transmissive envelope. The lamp also includes the present inventive phosphor layers, and one or more electrical leads at least partially disposed within the at least one light-transmissive envelope for providing electric current.

Referring to the drawings, FIG. 1 is a perspective view partially broken away of a low pressure mercury discharge fluorescent lamp 10 that includes a sealed light-transmissive envelope 12 having a circular cross section. A low pressure mercury discharge assembly 14 in lamp 10 includes a conventional electrode structure 16 at each end connected to lead-in wires 18 and 20 which extend through a glass press seal 22 in a mount stem 24 to electrical contacts (pins) 26 and 28 of a base 30 fixed at both ends of sealed light-transmissive envelope 12. The discharge-sustaining filling in sealed light-transmissive envelope 12 may be an inert gas, for example, argon, xenon, neon or krypton at a low pressure in combination with mercury vapor. A basecoat phosphor layer 32 may be disposed onto an inner surface 34 of light-transmissive envelope 12. A topcoat phosphor layer 36 may be disposed onto a surface 33 of basecoat phosphor layer 32. By "disposed onto inner surface 34" is meant to possibly include intervening layers such as barrier layers (not specifically shown) between inner surface 34 and basecoat phosphor layer 32. Often fluorescent lamps may have a layer of a non-luminescent barrier material, such as alumina, which is directly on the inner surface of the glass envelope, to absorb/reflect any escaping UV and to homogenize the appearance of the visible white light escaping. So, "disposed" can be directly on the inner surface, or more usually, with one or more intervening layers such as a barrier layer.

The relative amounts of the basecoat phosphor layer and topcoat phosphor layer may vary, but typically the weight of the basecoat phosphor layer is greater than the weight of the topcoat phosphor layer. In other embodiments, the weight of the basecoat phosphor layer may comprise about 50-99% of the total weight of the phosphor carried on the lamp (i.e., including weight of basecoat together with topcoat). In other embodiments, the basecoat phosphor layer may comprises about 90-99% of the total weight of the phosphor carried on the lamp.

In one embodiment, basecoat phosphor layer 32 includes at least one non-rare earth phosphor (such as a halophosphor), and may optionally include at least one rare earth phosphor. In another embodiment, basecoat phosphor layer 32 includes at least one halophosphor, and does not include any rare earth phosphors. In other embodiments, basecoat phosphor layer 32 is a blend of at least one halophosphor (e.g., two or more halophosphors such as alkaline metal phosphors), and optionally, at least one rare earth phosphor. The basecoat may also include one or more phosphors which are not rare earth phosphors and which are not strictly halophosphors. Examples of such may include zinc silicate, strontium red, (possibly also strontium blue), and the like. In another embodiment, the basecoat does not include any rare earth phosphors.

As used herein, a "non-rare earth phosphor" is a phosphor which is not activated by a rare earth element. It is intended to be a broad term, potentially inclusive of halophosphors or other phosphors which are not rare earth phosphors and which are not strictly halophosphors, such as zinc silicate or strontium red, and the like. As used herein, the term "halophosphor" is intended to refer to a phosphor which includes at least one halogen component (preferably chlorine or fluorine, or a mixture thereof) but which is not activated by a rare earth element. Chemically, a halophosphor may be a phosphate or halophosphate of an alkaline earth metal. Some examples of halophosphate-containing halophosphors may be calcium halophosphates, strontium halophosphates, and barium halophosphate. In some cases, calcium halophosphate halophosphors may have part of calcium (Ca) substituted by strontium (Sr) and/or barium (Ba). Usually, calcium halophosphate halophosphors may be activated by a transition metal element and/or a main group element, such as one or more of manganese (Mn) and antimony (Sb). An example of a formula for a doped calcium halophosphate is: $Ca_{10}(PO_4)_6(F,Cl)_2$:Sb,Mn. The actual color of this phosphor when irradiated by UV light can be white, but this may be varied depending on the actual amount of Sb, Mn, fluorine (F), and chlorine (Cl). If one of these four elements are omitted, more drastic effects occur. For example, if no Mn is present (i.e., the formula would be simply $Ca_{10}(PO_4)_6(F,Cl)_2$:Sb), then the phosphor emits only in the blue region. This latter is referred to as "blue halo" phosphor.

A halophosphor may emit a color upon excitation, or may emit light which is perceived to be white. An example of a blue or blue-green emitting halophosphor may include a calcium halophosphate (e.g, fluorophosphate) activated with antimony (3+). An example of a white-emitting halophosphor (e.g., white halo) may include a calcium fluoro-, chloro phosphate activated with antimony (3+) and manganese (2+), such as $Ca_{5-x-y}(PO_4)_3F_{1-z-y}Cl_zO_y$:$Mn_xSb_y$. Also, a red phosphor (europium-doped yttrium oxide) may be added to white halo to form a regal white halo. Other non-rare-earth-activated phosphors may include one or more of strontium red (e.g., $(Sr,Mg)_3(PO_4)_2$:Sn) and strontium blue (e.g., $Sr_{10}(PO_4)_6F_2$:Sb,Mn).

When reciting the chemical formulae for phosphors, the element(s) following the colon represents activator(s). If two or more elements are present after the colon, they are generally both present as activators. As used herein throughout this disclosure, the term "doped" is equivalent to the term "activated". The various phosphors of any color described herein can have different elements enclosed in parentheses and separated by commas, such as in $(Ba,Sr,Ca)MgAl_{10}O_{17}$:$Eu^{2+}$, $Mn^{2+}$ phosphor. As would be understood by anyone skilled in the art, the notation (A,B,C) signifies $(A_xB_yC_z)$ where $0 \leq x \leq 1$ and $0 \leq y \leq 1$ and $0 \leq z \leq 1$ and $x+y+z=1$. For example, (Sr,Ca,Ba) signifies $(Sr_xCa_yBa_z)$ where $0 \leq x \leq 1$ and $0 \leq y \leq 1$ and $0 \leq z \leq 1$ and $x+y+z=1$. Typically, but not always, x, y, and z are all nonzero. The notation (A,B) signifies $(A_xB_y)$ where $0 \leq x \leq 1$ and $0 \leq y \leq 1$ and $x+y=1$. Typically, but not always, x and y are both nonzero.

Topcoat phosphor layer 36 includes at least two rare earth phosphors. For example, in one embodiment, topcoat phosphor layer 36 includes a red-emitting rare earth phosphor, a green-emitting rare earth phosphor, and a blue-emitting rare earth phosphor. In other embodiments, topcoat phosphor layer 36 includes a red-emitting rare earth phosphor and a green-emitting rare earth phosphor, or topcoat phosphor layer 36 includes a red-emitting rare earth phosphor and a blue-emitting rare earth phosphor, or topcoat phosphor layer 36 includes a green-emitting rare earth phosphor and a blue-emitting rare earth phosphor. In another, topcoat phosphor layer 36 may also include at least one halophosphor in addition to the at least two rare earth phosphors. In the exemplary embodiment, the topcoat phosphor layer 36 does not include a halophosphor.

Topcoat phosphor layer 36 may include a red-emitting rare earth phosphor. A red-emitting rare earth phosphor may comprise one or more of: a europium-doped yttrium oxide (e.g., YEO); a europium-doped yttrium vanadate-phosphate (e.g., $Y(P,V)O_4$:Eu); a metal pentaborate doped with at least cerium (e.g., CBM); or the like. Other possible red rare earth phosphors may include Eu-activated yttrium oxysulfide, or europium(III)-doped gadolinium oxides and borates, such as $(Y,Gd)_2O_3$:$Eu^{3+}$ and $(Y,Gd)BO_3$:$Eu^{3+}$. A possible formula for the europium-doped yttrium oxide phosphor may be generally $(Y_{(1-x)}Eu_x)_2O_3$, where $0 \leq x \leq 0.1$, possibly, $0.02 \leq x \leq 0.07$, for example, x=0.06. Such europium-doped yttrium oxide phosphors are often abbreviated YEO (or sometimes YOX or YOE). A possible metal pentaborate doped with at least cerium can have formula $(Gd(Zn,Mg)B_5O_{10}$:$Ce^{3+}$, $Mn^{2+}$ (CBM).

Topcoat phosphor layer 36 may include a green-emitting rare earth phosphor. A green-emitting rare earth phosphor may comprise one or more of: a cerium- and terbium-coactivated phosphor (e.g., LAP or CAT); or a europium- and manganese-coactivated magnesium aluminate (e.g., BAMn); or CBT $((Gd(Zn,Mg)B_5O_{10}$:$Ce^{3+},Tb^{3+})$; or the like. A cerium- and terbium-doped phosphor may be a cerium- and terbium-doped lanthanum phosphate. Typical formulae for cerium- and terbium-doped lanthanum phosphate may include one selected from: $LaPO_4$:Ce,Tb; $LaPO_4$:$Ce^{3+},Tb^{3+}$; or $(La,Ce,Tb)PO_4$. Specific cerium- and terbium-doped lanthanum phosphate phosphors in accordance with embodiments of the invention may have the formula $(La_{(1-x-y)}Ce_xTb_y)PO_4$, where $0.1 \leq x \leq 0.6$ and $0 \leq y \leq 0.25$ (or possibly, $0.2 \leq x \leq 0.4$; $0.1 \leq y \leq 0.2$) (LAP). Other cerium- and terbium-doped phosphor may be $(Ce,Tb)MgAl_{11}O_{19}$ (CAT); and (Ce, Tb)(Mg,Mn)$Al_{11}O_{19}$. It is possible for BAMn to be considered as a green rare-earth phosphor, depending on the molar ratio among its activators.

Topcoat phosphor layer 36 may include a blue-emitting rare earth phosphor. A blue-emitting rare earth phosphor may comprise one or more of: a europium-doped halophosphate (e.g., SECA, with typical formula $(Sr,Ca,Ba)_5(PO_4)_3Cl$:$Eu^{2+}$), a europium-doped magnesium aluminate (e.g., BAM), a europium- and manganese-coactivated magnesium aluminate (e.g., BAMn), a europium-doped strontium aluminate (e.g., SAE), a europium-doped borophosphate, a cerium-doped yttrium aluminate (e.g., YAG); or the like. A europium-doped strontium aluminate may have the formula of $Sr_4Al_{14}O_{25}$:$Eu^{2+}$ (SAE). In such formula, the europium-doped strontium aluminate phosphor may comprise Sr and Eu in the following atom ratio: $Sr_{0.90-0.99}Eu_{0.01}$-0.1. BAM may have the formula $(Ba,Sr,Ca)MgAl_{10}O_{17}$:$Eu^{2+}$. BAMn may have the formula $(Ba,Sr,Ca)MgAl_{10}O_{17}$:$Eu^{2+},Mn^{2+}$. It is possible for BAMn to be sometimes considered as a blue-green, blue, or green rare-earth phosphor, often depending on the molar ratio among its activators.

A blue phosphor may have a peak emission of about 440 to 500 nm; a green phosphor may have a peak emission of about 500 to 600 nm; and a red phosphor may have a peak emission of about 610 to 670 nm (for certain red phosphors, there may be one or more peaks as low as 590 nm).

To achieve a CRI of at least 87, it is advantageous that the CRI of basecoat phosphor layer 32 is higher than the CRI of topcoat phosphor layer 36. In one embodiment, basecoat phosphor layer 32 has a CRI of at least about 87 (and more preferably has a CRI of at least about 90), and in another embodiment a CRI of from about 90 to about 98 (e.g., from about 90 to about 95). In one embodiment, topcoat phosphor layer 36 has a CRI of about 80 to about 88, and in another embodiment, a CRI of from about 82 to about 87.

Low-pressure discharge lamp 10 may generally be constructed by any effective method, including many known or conventional methods. Some non-limiting examples of materials which may comprise the discharge fill of lamps include at least one material selected from the group consisting of Hg, Na, Zn, Mn, Ni, Cu, Al, Ga, In, Tl, Sn, Pb, Bi, Ti, V, Cr, Zr, Nb, Mo, Hf, Ta, W, Re, Os, Ne, Ar, He, Kr, Xe and combinations and compounds thereof; or the like. In one embodiment, the discharge fill material in a lamp includes mercury. In another embodiment, the discharge fill material in a lamp is mercury free. In particular, where a substantially mercury-free discharge fill is desired, the discharge fill may comprise at least one material selected from the group consisting of a gallium halide, a zinc halide, and an indium halide, or the like. The fill will be present at any effective pressure to sustain a low-pressure discharge, as can be readily ascertained by any person skilled in the art. Some suitable pressures may include a total fill pressure of from about 0.1 kPa to about 30 kPa. In other embodiments, a total fill pressure may be higher than about 30 kPa, and a total fill pressure may be lower than about 0.1 kPa.

Basecoat phosphor layer 32 and topcoat phosphor layer 36 may be applied to or disposed onto inner surface 34 of light-transmissive envelope 12 by any effective method, including known or conventional methods, such as by slurrying. Methods of preparing and applying phosphor coating slurries are generally known or conventional in the art. For example, the components of basecoat phosphor layer 32 is coated as a layer onto inner surface 34 of light transmissive envelope 12 (the inner surface may already be carrying a barrier layer). A phosphor coating suspension is prepared by dispersing the desired topcoat phosphor particles in a water-based system that may include binders, for example, polyethylene oxide and hydroxyethyl cellulose, with water as the solvent. The phosphor suspension is applied by causing the suspension to flow down inner surface 34. Evaporation of the water results in an insoluble layer of phosphor particles adhering to inside surface 34 of light transmissive envelope 12. Basecoat phosphor layer 32 is then dried prior to overcoating with the components of topcoat phosphor layer 34. Topcoat phosphor layer 34 is similarly applied from a water based suspension containing the appropriate and desired blend of phosphors. The second water base suspension is allowed to flow over basecoat phosphor layer 32 until the liquid is drained from light transmissive envelope 12.

A vapor discharge lamp may include from 1 g (e.g., 1 mg/cm$^2$) to about 6 g (e.g., 6 mg/cm$^2$) of the phosphor coating. For example, a 4 ft. T8 fluorescent lamp utilizes from about 1 g to about 4 g/bulb of a phosphor coating, and a 4 ft. T12 fluorescent lamp utilizes from about 1 g to about 6 g/bulb of phosphor coating.

EXEMPLARY EMBODIMENTS

A first exemplary embodiment of a vapor discharge lamp includes a basecoat phosphor layer and a topcoat phosphor layer as described above. The phosphor layers of the first exemplary lamp applied to the light transmissive envelope of the lamp provides a correlated color temperature (CCT) of 6500 K. Table I shows the ingredients and weight percent of each ingredient of the basecoat phosphor layer and the topcoat phosphor layer of the first exemplary vapor discharge lamp.

TABLE I

| Composition | |
|---|---|
| | Phosphor Basecoat wt. % |
| Strontium Red | 32.4 |
| Strontium Blue | 45.8 |
| Blue Halo | 21.8 |
| | Phosphor Topcoat wt. % |
| YEO | 28.5 |
| LAP | 49.7 |
| BAM | 21.8 |
| | Relative Amount (wt. %) |

TABLE I-continued

| Composition | |
|---|---|
| | Of Each Phosphor Layer |
| Basecoat Phosphor Layer | ≈90 |
| Topcoat Phosphor Layer | ≈10 |

A second exemplary embodiment of a vapor discharge lamp includes a basecoat phosphor layer and a topcoat phosphor layer as described above. The phosphor layers of the second exemplary lamp applied to the light transmissive envelope of the lamp provides a CCT of 4100 K. Table II shows the ingredients and weight percent of each ingredient of the basecoat phosphor layer and the topcoat phosphor layer of the second exemplary vapor discharge lamp.

TABLE II

| Composition | |
|---|---|
| | Phosphor Basecoat wt. % |
| Strontium Red | 72.6 |
| BAMn | 6.7 |
| Blue Halo | 17.2 |
| | Phosphor Topcoat wt. % |
| YEO | 48.0 |
| LAP | 41.5 |
| BAM | 8.8 |
| | Relative Amount (wt. %) Of Each Phosphor Layer |
| Basecoat Phosphor Layer | ≈95 |
| Topcoat Phosphor Layer | ≈5 |

A third exemplary embodiment of a vapor discharge lamp includes a basecoat phosphor layer and a topcoat phosphor layer as described above. The phosphor layers of the third exemplary lamp applied to the light transmissive envelope of the lamp provides a CCT of 3000 K. Table III shows the ingredients and weight percent of each ingredient of the basecoat phosphor layer and the topcoat phosphor layer of the third exemplary vapor discharge lamp.

TABLE III

| Composition | |
|---|---|
| | Phosphor Basecoat wt. % |
| SAE | 5.7 |
| CBM | 48.1 |
| Zinc Silicate | 10.8 |
| White Halo | 35.2 |
| | Phosphor Topcoat wt. % |
| YEO | 60.7 |
| LAP | 36.9 |
| BAM | 2.4 |
| | Relative Amount (wt. %) Of Each Phosphor Layer |
| Basecoat Phosphor Layer | ≈90 |
| Topcoat Phosphor Layer | ≈10 |

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" used in connection with a quantity is inclusive of the stated value and has the meaning dictated by the context (for example, includes the degree of error associated with the measurement of the particular quantity). "Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present. The singular forms "a", "an" and "the" include plural referents unless the context clearly dictates otherwise. All ranges disclosed herein are inclusive of the recited endpoint and independently combinable. As used herein, the phrases "adapted to," "configured to," and the like refer to elements that are sized, arranged or manufactured to form a specified structure or to achieve a specified result.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A low-pressure discharge lamp, comprising:
   a light-transmissive envelope;
   a fill-gas composition capable of sustaining a discharge sealed inside said light-transmissive envelope; and
   a phosphor composition at least partially disposed on an interior surface of said light-transmissive envelope;
   said phosphor composition disposed on an interior surface of said light-transmissive envelope in a plurality of layers, said plurality of layers comprising at least a basecoat phosphor layer and a topcoat phosphor layer, said basecoat phosphor layer comprising at least one non-rare earth activated phosphor and said topcoat phosphor layer comprising a blend of at least two rare earth phosphors, wherein the basecoat phosphor layer comprises a greater Color Rendering Index (CRI) value than the topcoat phosphor layer.

2. The lamp in accordance with claim 1, wherein said lamp exhibits an overall CRI value of at least about 87.

3. The lamp in accordance with claim 1, wherein said topcoat phosphor layer is capable of a higher lumen output than said basecoat phosphor layer at the same level of excitation.

4. The lamp in accordance with claim 1, wherein the correlated color temperature (CCT) of said basecoat phosphor layer is comparable to the CCT of said topcoat phosphor layer.

5. The lamp in accordance with claim 4, wherein the CCT of said basecoat phosphor layer and the CCT of said topcoat phosphor layer are within about 1000 K of each other.

6. The lamp in accordance with claim 1, wherein said at least one non-rare earth activated phosphor comprises at least one halophosphor, and wherein said basecoat phosphor layer comprises a blend comprising said at least one halophosphor and at least one rare earth phosphor.

7. The lamp in accordance with claim 1, wherein said basecoat phosphor layer comprises a CRI of at least about 87.

8. The lamp in accordance with claim 7, wherein said basecoat phosphor layer comprises a CRI of from about 90 to about 98.

9. The lamp in accordance with claim 1, wherein said basecoat phosphor layer consists of one halophosphor.

10. The lamp in accordance with claim 1, wherein said topcoat phosphor layer comprises a CRI of less than about 87.

11. The lamp in accordance with claim 1, wherein said topcoat phosphor layer comprises at least three different rare earth phosphors.

12. The lamp in accordance with claim 1, wherein said topcoat phosphor layer comprises at least one of a red-emitting rare earth phosphor, a blue-emitting rare earth phosphor, and a green emitting rare earth phosphor.

13. The lamp in accordance with claim 12, wherein the red-emitting rare earth phosphor comprises YEO, yttrium vanadate, CBM, or combinations thereof.

14. The lamp in accordance with claim 12, wherein the green-emitting rare earth phosphor comprises LAP, BAMn, CAT, CBT, or combinations thereof.

15. The lamp in accordance with claim 12, wherein the blue-emitting rare earth phosphor comprises SAE, BAM, SECA, BAMn, or combinations thereof.

16. A low-pressure discharge lamp, comprising:
    a light-transmissive envelope;
    a fill-gas composition capable of sustaining a discharge sealed inside said light-transmissive envelope; and
    a phosphor composition at least partially disposed on an interior surface of said light-transmissive envelope;
    said phosphor composition disposed on an interior surface of said light-transmissive envelope in a plurality of layers, said plurality of layers comprising at least a basecoat phosphor layer and a topcoat phosphor layer, said basecoat phosphor layer comprising at least one non-rare earth activated phosphor and said topcoat phosphor layer comprising a blend of at least three rare earth phosphors, wherein the basecoat phosphor layer comprises a greater Color Rendering Index (CRI) value than the topcoat phosphor layer and the basecoat phosphor layer has a CRI of at least about 87; and
    wherein said lamp exhibits an overall CRI value of at least about 87; and
    wherein the weight of the basecoat phosphor layer is greater than the weight of the topcoat phosphor layer; and
    wherein the difference in correlated color temperature between the basecoat phosphor layer and a topcoat phosphor layer does not exceed about 1000 K.

17. A method of making a low-pressure discharge lamp, said method comprising:
    coating an inner surface of a light-transmissive envelope with a first phosphor coating composition comprising at least one non-rare earth activated phosphor to form a basecoat phosphor layer; and
    coating a surface of said basecoat phosphor layer with a second phosphor coating composition comprising a blend of at least two rare earth phosphors to form a topcoat phosphor layer, wherein the basecoat phosphor layer comprises a greater Color Rendering Index (CRI) value than the topcoat phosphor layer.

18. The method in accordance with claim 17, wherein the at least one non-rare earth activated phosphor comprises at least one halophosphor, and wherein the basecoat phosphor layer comprises a blend comprising the at least one halophosphor and at least one rare earth phosphor.

19. The method in accordance with claim 17, wherein the lamp exhibits an overall CRI value of at least about 87.

20. The method in accordance with claim 17, wherein the basecoat phosphor layer has a CRI of at least about 87.

* * * * *